United States Patent [19]

Barwich et al.

[11] Patent Number: 5,532,321
[45] Date of Patent: Jul. 2, 1996

[54] COPOLYMERS AND BLENDS WHICH ARE SELF-CURABLE UNDER THE ACTION OF ATMOSPHERIC HUMIDITY

[75] Inventors: Juergen Barwich, Neustadt; Heinz Plaumann, Limburgerhof; Eckehardt Wistuba, Bad Durkheim, all of Germany

[73] Assignee: BASF Aktiengesellschaft, Ludwigshafen, Germany

[21] Appl. No.: 238,901

[22] Filed: May 6, 1994

[30] Foreign Application Priority Data

May 12, 1993 [DE] Germany .......................... 43 15 880.3

[51] Int. Cl.⁶ .................... C08F 220/12; C08F 222/06
[52] U.S. Cl. .................. 525/103; 525/102; 525/101; 525/100; 525/207; 525/209
[58] Field of Search ..................... 525/103, 207, 525/209, 100, 102, 101

[56] References Cited

U.S. PATENT DOCUMENTS

| | | | |
|---|---|---|---|
| 4,368,297 | 1/1983 | Kato et al. | 525/342 |
| 4,468,492 | 8/1984 | Piccirilli et al. | 525/102 |
| 4,518,726 | 5/1985 | Kato et al. | 524/32 |
| 4,543,403 | 9/1985 | Isayama et al. | 526/263 |
| 4,818,790 | 4/1989 | Ooka et al. | 525/103 |
| 5,063,114 | 11/1991 | Nambu et al. | 428/447 |

FOREIGN PATENT DOCUMENTS

| | | |
|---|---|---|
| 0029100 | 5/1981 | European Pat. Off. . |
| 0122457 | 10/1984 | European Pat. Off. . |
| 0387587 | 9/1990 | European Pat. Off. . |
| 0401540 | 12/1990 | European Pat. Off. . |
| 3426057 | 1/1986 | Germany . |
| 3903991 | 8/1990 | Germany . |
| 3913168 | 10/1990 | Germany . |
| 4038939 | 6/1992 | Germany . |

*Primary Examiner*—Ralph H. Dean
*Attorney, Agent, or Firm*—Oblon, Spivak, McClelland, Maier & Neustadt

[57] ABSTRACT

Essentially isocyanate-free, ketimine- and aldimine-free, one-component sealing, adhesive or coating materials which are self-curable under the action of atmospheric humidity containing a copolymer A composed of 50–99.8% by weight of a $C_1$–$C_{16}$-alkyl (meth)acrylate or vinyl ester of carboxylic acids of 1 to 20 carbon atoms a), 0.1–20% by weight of an unsaturated carboxylic anhydride b), 0.1–10% by weight of an Si-containing compound c) capable of undergoing hydrolysis and 0–40% by weight of a further, copolymerizable unsaturated compound d)

or containing a mixture of copolymers comprising

5–95% by weight, based on the mixture, of a copolymer B), composed of

50–99.9% by weight of a $C_1$–$C_{16}$-alkyl (meth)acrylate or vinyl ester of carboxylic acids of 1 to 20 carbon atoms a), 0–20% by weight of an unsaturated carboxylic anhydride b)

0.1–10% by weight of an Si-containing compound c) capable of undergoing hydrolysis and 0–40% by weight of a further, copolymerizable unsaturated compound d)

and

5–95% by weight, based on the mixture, of a copolymer C) composed of

50–99.9% by weight of a $C_1$–$C_{16}$-alkyl (meth)acrylate or vinyl ester of carboxylic acids of 1 to 20 carbon atoms a), 0.1–20% by weight of an unsaturated carboxylic anhydride b), 0–10% by weight of an Si-containing compound c) capable of undergoing hydrolysis and 0–40% by weight of a further, copolymerizable unsaturated compound d), the K value of one of the copolymers B) or C) being from 12 to 40 and that of the other copolymer being from 30 to 70 and the K values of the two copolymers differing by at least 5K value units, where the K value is measured according to DIN 53,726.

8 Claims, No Drawings

COPOLYMERS AND BLENDS WHICH ARE SELF-CURABLE UNDER THE ACTION OF ATMOSPHERIC HUMIDITY

The present invention relates to essentially isocyanate-free, kerimine-free and aldimine-free, one-component sealing, adhesive or coating materials which are self-curable under the action of atmospheric humidity, containing a copolymer A composed of 50–99.8% by weight of a $C_1$–$C_{16}$-alkyl (meth)acrylate or vinyl ester of carboxylic acids of 1 to 20 carbon atoms a), 0.1–20% by weight of an unsaturated carboxylic anhydride b), 0.1–10% by weight of an Si-containing compound c) capable of undergoing hydrolysis and 0–40% by weight of a further, copolymerizable unsaturated compound d)

or containing a mixture of copolymers comprising

5–95% by weight, based on the mixture, of a copolymer B), composed of

50–99.9% by weight of a $C_1$–$C_{16}$-alkyl (meth)acrylate of a $C_1$–$C_{16}$-alkyl (meth)acrylate or vinyl ester of carboxylic acids of 1 to 20 carbon atoms a), 0–20% by weight of an unsaturated carboxylic anhydride b) 0.1–10% by weight of an Si-containing compound c) capable of undergoing hydrolysis and 0–40% by weight of a further, copolymerizable unsaturated compound d)

and

5–95% by weight, based on the mixture, of a copolymer C) composed of

50–99.9% by weight of a $C_1$–$C_{16}$-alkyl (meth)acrylate or vinyl ester of carboxylic acids of 1 to 20 carbon atoms a), 0.1–20% by weight of an unsaturated carboxylic anhydride b), 0–10% by weight of an Si-containing compound c) capable of undergoing hydrolysis and 0–40% by weight of a further, copolymerizable unsaturated compound d), the K value of one of the copolymers B) or C) being from 12 to 40 and that of the other copolymer being from 30 to 70 and the K values of the two copolymers differing by at least 5K value units, where the K value is measured according to DIN 53,726.

Related to the ISO Standard ISO 174–1974 issued by the International Organization for Standardization (ISO), see notes.

1 Purpose and scope

The procedure according to this standard serves for determining the viscosity number and/or the K-value of VC polymers at 25° C. in a solution containing 0.5 g of VC polymer per 100 $cm^3$ of solution. The solvent used is cyclohexanone. The viscosity number or the K-value are parameters for characterizing the degree of polymerization of a VC polymer.

The procedure can be applied to all vinyl chloride homopolymers and those vinyl chloride copolymers which dissolve in cyclohexanone under the conditions specified in section 6.2. If the polymer to be tested contains additions which affect the measurement of the viscosity, special test procedures are to be agreed.

2 Terms 2.1 Viscosity number[1]

The viscosity number J is the relative change in viscosity, based on the concentration by mass β of the VC polymer in the solution,

[1] See also DIN 1342

$$J = \frac{\eta - \eta_0}{\eta_0} \cdot \frac{1}{\beta}$$

The symbols in the formula have the following meanings:

J Viscosity number in $cm^3/g$

η Dynamic viscosity of the solution $\eta_0$ Dynamic viscosity of the solvent

β Concentration by mass of VC polymer in the solution, in $g/cm^3$,

Note: DIN 1310 (in draft format present) specifies the formula symbol β for the concentration by mass, in this case in $g/cm^3$.

2.2 K-value

The K-value is defined by the following numerical-value equations: K-value=1000 k. k is calculated, according to H. Fikentscher, as follows:

$$\log \eta_r = \left( \frac{75k^2}{1 + 150k \cdot \beta} + k \right) \cdot 100\beta$$

$$k = \frac{1.5 \log \eta_r - 1 \pm \sqrt{1 + \left( \frac{2}{\beta} + 2 + 1.5 \log \eta_r \right) 1.5 \log \eta_r}}{150 + 300\beta}$$

The symbols in these equations have the following meanings:

$$\eta_r = \frac{\eta}{\eta_0} \text{ relative viscosity}$$

β and $\eta_0$, η see section 2.1.

3 Name of the procedure

Designation — Viscosity number
Number of the standard — DIN 53726-A
Procedure —

4 Sampling

A sample is taken from the VC polymer to be tested. Any pretreatment of the sample is to be agreed and to be specified in the test report.

5 Test equipment and test media 5.1 Test equipment

Ubbelohde viscometer No. I according to DIN 51562 Part 1 or any other capillary viscometer with which identical results can be achieved.

Stopwatch having a scale interval of 0.1 s.

Balance having a scale interval of 0.1 mg, 50 ml volumetric flask with ring mark, conical ground joint and glass stopper, e.g. in accordance with DIN 12664, Part 1, Heatable magnetic stirrer appliance with continuously variable heating output. The magnetic stirrer rod having a length of approximately 30 mm and a diameter of approximately 7 nun must be coated with polytetrafluoroethylene (PTFE).

Horseshoe magnet for removing the magnetic stirrer rod from the 50 ml volumetric flask.

400 ml glass beaker, e.g. in accordance with DIN 12332.

Transparent waterbath thermostat for a temperature of (25±0.05)°C.

Glass filter crucible having a maximum nominal pore width of from 40 to 100 μm or glass funnel with filter paper, e.g. for chemical analyses of grade i a in accordance with DIN 53135.

500 ml glass wash bottle with standard ground joint. Standards Committee Plastics (FNK) in DIN "Deutsches Institut für Normung e.V." Standards Committee Materials Testing (NMP) in DIN Page 2 DIN 53726

5.2 Test media

Solvents:

Cyclohexanone, chemically pure. Distilled fraction at a temperature between 155° and 156° C. and a pressure of 1013 mbar. The solvent is stored in the dark for at most 2 weeks, before the test is carried out, in a brown glass bottle with ground stopper.

Kinematic viscosity of cyclohexanone at 25° C.=from 2.06 to 2.14 mm$^2$/s.

Cleaning media:

Sulfuric acid, mass fraction between 95 and 97 %

Aqueous potassium dichromate solution, saturated

Acetone, chemically pure Heating bath fluid: diethylene glycol

6 Procedure 6.1 Cleaning of the viscometer

Before being used for the first time, and subsequently from time to time, the viscometer is cleaned with a mixture (chromic-sulfuric acid) of equal parts by volume of sulfuric acid and potassium dichromate solution. It is then rinsed successively with distilled water and acetone, and is dried by dry, dust-free air being blown through.

Between two successive tests, the viscometer is merely rinsed with acetone, or at least twice with the solution newly to be measured. If cleaning is carried out with acetone, drying as described is mandatory. The last solution of the test series must, in every instance, be flushed from the viscometer using acetone, so as to avoid the formation of a polymer film on the inner walls.

6.2 Preparing the solution

A sample of (250±5) mg of the VC polymer to be tested is weighed to an accuracy of 0.2 mg and is transferred quantitatively into the 50 ml volumetric flask. Then, about 40 ml of the solvent are added, the volumetric flask being agitated at the same time to prevent the formation of lumps. After the magnetic stirrer rod has been carefully placed into the volumetric flask, the latter is placed into the 400 ml beaker half filled with diethylene glycol. Then the magnetic stirring appliance is switched on, and the beaker is placed on its hotplate. The heating output of the hotplate should be set in such a way that the heating bath fluid reaches a stable temperature of approximately 85° C. The volumetric flask is left in the beaker until the sample has dissolved completely (experience shows that this takes one hour). Then the solution is cooled to 20° C. in the waterbath thermostat. By means of the horseshoe magnet guided from outside along the flask wall, the magnetic stirrer rod is pulled up as far as the neck of the flask, is rinsed with solvent by means of the wash bottle and is then taken from the neck of the volumetric flask.

Then the flask is topped up with the solvent of 20° C. as far as the mark, is closed and agitated for 1 min.

Instead of this procedure, the solution can also be prepared—without use of a magnetic stirring appliance—in an oven at a temperature between 80° and 90° C., with occasional agitation. This dissolution process is more time-consuming, however.

6.3 Measurement of the efflux times of the solution and the solvent

The solution and solvent are each filtered through the glass filter crucible. Instead of the glass filter crucible it is also possible to use a glass funnel and c) Viscometer employed d) Viscosity number, rounded to integers and/or e) K-value, rounded to one decimal after the point f) Any agreed conditions deviating from the present standard g) Test date.

TABLE A1

Comparison values between the viscosity number and the K-value

| $t/t_o$ | Viscosity number/ in cm$^3$/g | K-value | $t/t_o$ | Viscosity number/ in cm$^3$/g | K-value | $t/t_o$ | Viscosity number/ in cm$^3$/g | K-value |
| --- | --- | --- | --- | --- | --- | --- | --- | --- |
| 1.195 | 39 | 39.7 | 1.520 | 104 | 64.7 | 1.845 | 169 | 79.9 |
| 1.200 | 40 | 40.3 | 1.525 | 105 | 64.9 | 1.850 | 170 | 80.1 |
| 1.205 | 41 | 40.8 | 1.530 | 106 | 65.2 | 1.855 | 171 | 80.3 |
| 1.210 | 42 | 41.3 | 1.535 | 107 | 65.5 | 1.860 | 172 | 80.5 |
| 1.215 | 43 | 41.8 | 1.540 | 108 | 65.8 | 1.865 | 173 | 80.7 |
| 1.220 | 44 | 42.3 | 1.545 | 109 | 66.1 | 1.870 | 174 | 80.9 |
| 1.225 | 45 | 42.9 | 1.550 | 110 | 66.3 | 1.875 | 175 | 81.1 |
| 1.230 | 46 | 43.3 | 1.555 | 111 | 66.6 | 1.880 | 176 | 81.3 |
| 1.235 | 47 | 43.8 | 1.560 | 112 | 66.9 | 1.885 | 177 | 81.5 |
| 1.240 | 48 | 44.3 | 1.565 | 113 | 67.1 | 1.890 | 178 | 81.7 |
| 1.245 | 49 | 44.8 | 1.570 | 114 | 67.4 | 1.895 | 179 | 81.8 |
| 1.250 | 50 | 45.3 | 1.575 | 115 | 67.7 | 1.900 | 180 | 82.0 |
| 1.255 | 51 | 45.7 | 1.580 | 116 | 67.9 | 1.905 | 181 | 82.2 |
| 1.260 | 52 | 46.2 | 1.585 | 117 | 68.2 | 1.910 | 182 | 82.4 |
| 1.265 | 53 | 46.6 | 1.590 | 118 | 68.5 | 1.915 | 183 | 82.6 |
| 1.270 | 54 | 47.1 | 1.595 | 119 | 68.7 | 1.920 | 184 | 82.8 |
| 1.275 | 55 | 47.5 | 1.600 | 120 | 69.0 | 1.925 | 185 | 83.0 |
| 1.280 | 58 | 48.0 | 1.605 | 121 | 69.2 | 1.930 | 188 | 83.1 |
| 1.285 | 57 | 48.4 | 1.610 | 122 | 69.5 | 1.935 | 187 | 83.3 |
| 1.290 | 58 | 48.8 | 1.615 | 123 | 69.7 | 1.940 | 188 | 83.5 |
| 1.295 | 59 | 49.2 | 1.620 | 124 | 70.0 | 1.945 | 189 | 83.7 |
| 1.300 | 60 | 49.6 | 1.625 | 125 | 70.2 | 1.950 | 190 | 83.9 |

TABLE A1-continued

Comparison values between the viscosity number and the K-value

| $t/t_o$ | Viscosity number/ in cm³/g | K-value | $t/t_o$ | Viscosity number/ in cm³/g | K-value | $t/t_o$ | Viscosity number/ in cm³/g | K-value |
|---|---|---|---|---|---|---|---|---|
| 1.305 | 61 | 50.1 | 1.630 | 126 | 70.5 | 1.955 | 191 | 84.0 |
| 1.310 | 62 | 50.5 | 1.635 | 127 | 70.7 | 1.960 | 192 | 84.2 |
| 1.315 | 63 | 50.9 | 1.640 | 128 | 71.0 | 1.965 | 193 | 84.4 |
| 1.320 | 64 | 51.3 | 1.645 | 129 | 71.2 | 1.970 | 194 | 84.6 |
| 1.325 | 65 | 51.7 | 1.650 | 130 | 71.5 | 1.975 | 195 | 84.7 |
| 1.330 | 66 | 52.1 | 1.655 | 131 | 71.7 | 1.980 | 196 | 84.9 |
| 1.335 | 67 | 52.4 | 1.660 | 132 | 71.9 | 1.985 | 197 | 85.1 |
| 1.340 | 68 | 52.8 | 1.665 | 133 | 72.2 | 1.990 | 198 | 85.3 |
| 1.345 | 69 | 53.2 | 1.670 | 134 | 72.4 | 1.995 | 199 | 85.4 |
| 1.350 | 70 | 53.6 | 1.675 | 135 | 72.6 | 2.000 | 200 | 85.6 |
| 1.355 | 71 | 54.0 | 1.680 | 136 | 72.9 | 2.005 | 201 | 85.8 |
| 1.360 | 72 | 54.3 | 1.685 | 137 | 73.1 | 2.010 | 202 | 85.9 |
| 1.365 | 73 | 54.7 | 1.690 | 138 | 73.3 | 2.015 | 203 | 86.1 |
| 1.370 | 74 | 55.1 | 1.695 | 139 | 73.6 | 2.020 | 204 | 86.3 |
| 1.375 | 75 | 55.4 | 1.700 | 140 | 73.8 | 2.025 | 205 | 86.5 |
| 1.380 | 76 | 55.8 | 1.705 | 141 | 74.0 | 2.030 | 206 | 86.6 |
| 1.385 | 77 | 56.1 | 1.710 | 141 | 74.3 | 2.035 | 207 | 86.8 |
| 1.390 | 78 | 56.5 | 1.715 | 143 | 74.5 | 2.040 | 208 | 87.0 |
| 1.395 | 79 | 56.8 | 1.720 | 144 | 74.7 | 2.045 | 209 | 87.1 |
| 1.400 | 80 | 57.2 | 1.725 | 145 | 74.9 | 2.050 | 210 | 87.3 |
| 1.405 | 81 | 57.5 | 1.730 | 146 | 75.1 | 2.055 | 211 | 87.4 |
| 1.410 | 82 | 57.9 | 1.735 | 147 | 75.4 | 2.060 | 212 | 87.6 |
| 1.415 | 83 | 58.2 | 1.740 | 148 | 75.6 | 2.065 | 213 | 87.8 |
| 1.420 | 84 | 58.5 | 1.745 | 149 | 75.8 | 2.070 | 214 | 87.9 |
| 1.425 | 85 | 58.9 | 1.750 | 150 | 76.0 | 2.075 | 215 | 88.1 |
| 1.430 | 86 | 59.2 | 1.755 | 151 | 76.2 | 2.080 | 216 | 88.3 |
| 1.435 | 87 | 59.5 | 1.760 | 152 | 76.5 | 2.085 | 217 | 88.4 |
| 1.440 | 88 | 59.8 | 1.765 | 153 | 76.7 | 2.090 | 218 | 88.6 |
| 1.445 | 89 | 60.1 | 1.770 | 154 | 76.9 | 2.095 | 219 | 88.7 |
| 1.450 | 90 | 60.5 | 1.775 | 155 | 77.1 | 2.100 | 220 | 88.9 |
| 1.455 | 91 | 60.8 | 1.780 | 156 | 77.3 | 2.105 | 221 | 89.0 |
| 1.460 | 92 | 61.1 | 1.785 | 157 | 77.5 | 2.110 | 222 | 89.2 |
| 1.465 | 93 | 61.4 | 1.790 | 158 | 77.7 | 2.115 | 223 | 89.4 |
| 1.470 | 94 | 61.7 | 1.795 | 159 | 77.9 | 2.120 | 224 | 89.5 |
| 1.475 | 95 | 62.0 | 1.800 | 160 | 78.1 | 2.125 | 225 | 89.7 |
| 1.480 | 96 | 62.3 | 1.805 | 161 | 78.3 | 2.130 | 226 | 89.8 |
| 1.485 | 97 | 62.6 | 1.810 | 162 | 78.5 | 2.135 | 227 | 90.0 |
| 1.490 | 98 | 62.9 | 1.815 | 163 | 78.7 | 2.140 | 228 | 90.1 |
| 1.495 | 99 | 63.2 | 1.820 | 164 | 78.9 | 2.145 | 229 | 90.3 |
| 1.500 | 100 | 63.5 | 1.825 | 165 | 79.1 | 2.150 | 230 | 90.4 |
| 1.505 | 101 | 63.8 | 1.830 | 166 | 79.3 | 2.155 | 231 | 90.6 |
| 1.510 | 102 | 64.1 | 1.835 | 167 | 79.5 | 2.160 | 232 | 90.7 |
| 1.515 | 103 | 64.4 | 1.840 | 168 | 79.7 | 2.165 | 233 | 90.9 |
|  |  |  |  |  |  | 2.170 | 234 | 91.0 |

Standards quoted

| DIN 1310 | (in draft form at present) Composition of mixed phases (gas mixtures, solutions, mixed crystals); terms, symbols |
|---|---|
| DIN 1342 | Viscosity of Newtonian fluids |
| DIN 12332 | Glass laboratory equipment; beakers, low shape |
| DIN 12664, Part 1 | Glass laboratory equipment; volumetric flasks with a mark, volumetric flasks with beaded rim, conical socket and taper-ground joint |
| DIN 51562, Part 1 | Viscometry; determination of the kinematic viscosity using the standard-design Ubbelohde viscometer |
| DIN 53135 | Filter papers for chemical analyses; classification, designation, main properties, test procedures |

Earlier issue
 DIN 53726:06.61
Updates
 Compared to the issue of June 1961, the standard has been revised editorially, a few statements have been made more specific, and a better procedure has been described for preparing the solution.
Explanatory notes
 The present standard has been compiled by the subcommittee 303.2 "PVC molding materials". The specifications it contains agree factually with those in the ISO Standard 174–1974 "Plastics; determination of viscosity number of PVC resin in dilute solution".
International patent classification
 G 05 D 11–12
 C 07 C 69–01
 The present invention furthermore relates to copolymers or blends of copolymers which are self-curable under the action of atmospheric humidity.
 One-component sealing materials which are self-curable under the action of atmospheric humidity are stored in closed containers, for example cartridges. They do not require the addition of a second component when used. As soon as the container is opened or the sealing material is pressed out of the cartridge, self-curable begins under the action of atmospheric humidity.
 Conventional sealing materials which are curable under the action of atmospheric humidity contain a wide range of isocyanate compounds as crosslinking agents. According to DE-A 39 13 168, isocyanates may be polymerized in polymers. DE-A 40 38 939 discloses, as sealing materials, mixtures of diisocyanates or aldimines or kerimines with copolymers which contain bound, hydrolyzed Si compounds as regulators.

The disadvantages of sealing materials which cure under the action of atmospheric humidity and contain isocyanate compounds are the yellowing observed and in particular the formation of carbon dioxide during curing. The mechanical properties of the cured sealing materials are adversely affected by included gas. Furthermore, the evolution of gas rules out applications where there should be no increase in volume.

Further copolymers which contain hydrolyzable Si compounds and are used in sealing or coating materials are disclosed in DE-A 39 07 991, DE-A 34 26 057 and EP-A-122 457.

In general, sealing or coating materials which have high tensile strength and good elasticity after stress application, for example elongation, and do not tend to yellow and in which no gas evolution occurs are desirable.

It is an object of the present invention to provide such materials.

We have found that this object is achieved by the materials defined above.

The sealing, adhesive or coating materials contain a copolymer A or a mixture of copolymers B) and C).

The copolymers contain, as components, $C_1$–$C_{16}$-alkyl (meth)acrylates a), unsaturated carboxylic anhydrides b), an Si-containing compound c) capable of undergoing hydrolysis and further polymerizable, unsaturated compounds d).

Preferred compounds a) are $C_1$–$C_{16}$-alkyl (meth)acrylates, particularly preferably $C_1$–$C_8$-alkyl (meth)acrylates, such as methyl (meth)acrylate, ethyl (meth)acrylate, n-propyl (meth)acrylate, isopropyl (meth)acrylate, n-butyl (meth)acrylate and 2-ethylhexyl (meth)acrylate. In addition to the $C_1$–$C_{16}$-alkyl (meth)acrylates, other suitable compounds a) are vinyl esters of carboxylic acids of 1 to 20 carbon atoms, such as vinyl laurate, vinyl stearate, vinyl propionate and in particular vinyl acetate, as well as mixtures thereof with $C_1$–$C_{16}$-alkyl (meth)acrylates.

Unsaturated carboxylic anhydrides b) are preferably of 4 to 8, particularly preferably 4 or 5, carbon atoms. Examples are maleic anhydride, itaconic anhydride, citraconic dianhydride and cyclohexenedicarboxylic anhydride.

The Si-containing compounds capable of undergoing hydrolysis are preferably compounds of the general formula I

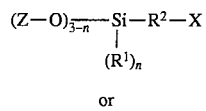   I or

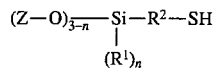   II or mixtures thereof, where $R^1$ and $Z$ are each $C_1$–$C_{18}$-alkyl, preferably $C_1$–$C_6$-alkyl, or phenyl, $R^2$ is $C_1$–$C_{18}$-alkylene, preferably $C_1$–$C_6$-alkylene, cyclohexylene or phenylene, X is a group capable of undergoing free radical polymerization and n is 0, 1 or 2. X is preferably a (meth)acrylate, (meth)acrylamide or vinyl radical.

Examples are 3-acryloyloxypropyltriethoxysilane, 3-methacryloyloxypropylmethyldiethoxysilane, 3-methacryloyl-oxypropyldimethylethoxysilane, 3-methacryloyloxy-propyltris(2-methoxyethoxy)silane, vinyltrimethoxysilane, vinyltris(methoxyethoxy)silane and in particular (meth)acryloyloxypropyltrimethoxysilane (MEMO), 3-mercapto-propyltrimethoxysilane and 3-mercaptopropyltriethoxysilane.

Compounds of the formula I are incorporated as monomers by copolymerization with the group X.

Compounds of the formula II are incorporated as regulators in the form of terminal groups in the polymer chain and, owing to their regulating effect, reduce the molecular weight and hence also the K value.

Compounds d) are vinylaromatic compounds, such as vinyltoluene, α- and p-methylstyrene, α-butylstyrene, 4-n-butylstyrene, 4-n-decylstyrene and preferably styrene, vinyl halides, preferably vinyl chloride and vinylidene chloride, and nonaromatic hydrocarbons having 2 to 8 carbon atoms and at least two olefinic double bonds, such as butadiene, isoprene and chloroprene, as well as $C_2$–$C_4$-olefins, e.g. ethylene.

Copolymer A is preferably composed of
70–99% by weight of a),
0.1–12% by weight of b),
0.1–8% by weight of c) and
0–25% by weight of d).

The K value of the copolymer A is preferably from 20 to 60.

The K value is a relative viscosity number which is determined according to DIN 53,726 at 25° C. It indicates the flow rate of a mixture of 0.01 g of polymer in 1 ml of tetrahydrofuran (THF) relative to the flow rate of pure THF and characterizes the average degree of polymerization of the polymers.

The glass transition temperature $T_g$ of the copolymer A) is preferably from –70° to +20° C., particularly preferably from –50° to +20° C., very preferably from –40° to –10° C. Above the $T_g$, the polymer is liquid.

The glass transition temperature of the copolymer can be determined by conventional methods, such as differential thermal analysis or differential scanning calorimetry (cf. for example ASTM 3418/82, midpoint temperature).

A preferred mixture, containing copolymers B) and C), contains from 20 to 80% by weight of copolymer B) and from 20 to 80% by weight of copolymer C).

Copolymer B) is preferably composed of from 70 to 99.9% by weight of a),
0–10% by weight of b),
0.1–8% by weight of c) and
0–25% by weight of d).

Copolymer C) is preferably composed of
0–99% by weight of a),
0.1–12% by weight of b),
0–6% by weight of c) and
0–25% by weight of d).

Copolyer B) very particularly preferably contains essentially no compound b) and copolymer C) essentially no compound c).

One of the two copolymers B) or C) has a higher molecular weight, characterized by a K value of 30 to 70, preferably from 35 to 55, and the other copolymer has a K value of from 12 to 40, preferably from 15 to 30.

Very particularly preferably, copolymer C) has the higher K value.

The K values of the two copolymers differ by at least 5, preferably by at least 15K value units.

The above statements (for copolymer A) are applicable to the glass transition temperature of copolymers B) and C).

Compounds of the formula I or II or mixtures thereof may be used as compound c) in the copolymers A), B) and C).

Copolymers having a K value of 30 or higher preferably contain copolymerizable Si compounds of the formula I.

Copolymers having a K value of less than 30 preferably contain regulatory Si compounds of the formula II or mixtures of Si compounds of the formulae I and II with at least 10, preferably at least 40, % by weight of the compounds II, the percentages being based on the total content of the compounds c).

The copolymers are prepared by free radical polymerization, for example by mass polymerization (in the absence of solvent) or preferably solution polymerization, in general at from 20° to 120° C., preferably from 80° to 120° C.

The solution polymerization can be carried out as a batch process or in the form of a feed process. The feed process in which some of the polymerization batch is initially taken and heated to the polymerization temperature and the remainder is then fed in continuously is preferred.

As a rule, ethers, such as tetrahydrofuran or dioxane, esters, such as ethyl acetate or n-butyl acetate, ketones, such as acetone or cyclohexanone, N,N-dialkylcarboxamides, such as N,N-dimethylformamide, N,N-dimethylacetamide or N-methyl-2-pyrrolidone, aromatics, such as toluene and xylene, aliphatic hydrocarbons, such as isooctane, chlorohydrocarbons, such as tert-butyl chloride, or plasticizers, such as di-n-butyl phthalate, are used as solvents for the free radical solution polymerization.

The reaction is advantageously carried out in an anhydrous polymerization medium, ie. at a water content of less than 100 ppm. The solution polymerization of the essentially anhydrous reactants is advantageously carried out in the presence of small amounts of drying agents, such as tetraalkoxysilanes, e.g. tetramethoxysilane, or trialkyl orthoformates, e.g. triethyl orthoformate, with or without the addition of a Lewis acid. The solvent can, if required, be partially or completely separated off from the resulting solutions of the copolymers, for example by distillation under reduced pressure.

Preferred initiators are dibenzoyl peroxide, tert-butyl perpivalate, tert-butyl per-2-ethylhexanoate, di-tert-butyl peroxide, tert-butyl hydroperoxide, cumyl hydroperoxide, dilauryl peroxide, tert-butyl peroxymaleate, tert-butyl peroxybenzoate, dicumyl peroxide, didecanoyl peroxide, methyl ethyl ketone peroxide, 2,2'-azobis-(2,4-dimethylvaleronitrile), 2,2'-azobis-(2,3-dimethylbutyronitrile) and 2,2'-azobisisobutyronitrile. Azo initiators containing silane groups are also suitable (EP-A 159 710).

Copolymer A) or the mixture containing copolymer B) and C) is preferably used as sealing, adhesive or coating material.

Sealing, adhesive and coating materials which contain, as a polymer base, copolymer A) or a mixture of copolymer B) and C) are preferably essentially free of isocyanate compounds, kerimines or aldimines, as stated in, for example, DE-A 40 38 939.

The sealing, adhesive and coating materials are preferably one-component materials, ie. no additives are required for curing. Curing is effected only by the action of atmospheric humidity. In order to accelerate the curing, however, catalysts, in particular dialkyltin dicarboxylates, e.g. dibutyltin dilaurate, may be added to the materials in small amounts, in general in amounts of 0.05–2.0% by weight, based on the polymer material. The materials may contain further conventional additives.

The materials preferably contain no solvent or only residual amounts of solvent from the preparation copolymers, in amounts of less then 5, preferably less than 1, % by weight, based on the materials.

As in the case of the preparation of the individual copolymers, when the components of the sealing, adhesive and coating materials are mixed it is necessary to ensure that moisture is absent. The sealing, adhesive and coating materials are preferably stored in a sealed container, for example a cartridge.

The novel sealing, adhesive end coating materials cure rapidly under the action of atmospheric humidity.

In the absence of moisture, the materials generally have a shelf life of more then 6 months.

The materials are processed in the liquid state, in particular at from 10° to 100° C. They ten be applied or pressed into cavities, after which curing occurs under the action of atmospheric humidity.

Examples of suitable substrates which are treated as materials are those consisting of plastic, metal, concrete, ceramic or wood.

Owing to their high elasticity in the cured state, the materials are used in particular for bridging cracks in the substrate or filling expansion joints. Novel materials based on copolymers having a glass transition temperature of from −10° to −40° C. are preferably used outdoors.

The novel sealing materials exhibit particularly good adhesion to glass, aluminum and ceramic. They can also be overcoated.

Included gas, which presents problems in the case of isocyanate-containing sealing materials are avoided in the present invention. The novel materials are therefore suitable for use as transparent sealing materials.

In the cured state, the novel materials have a very good tensile strength and elongation at break.

EXAMPLES

Abbreviations

BA: n-Butyl acrylate

MAA: Maleic anhydride

MEMO: Methacryloyloxypropyltrimethoxysilane

MTMO: Mercaptotrimethoxysilane

DBTL: Dibutyltin dilaurate

Preparation of the copolymers

Copolymer E1

Feed 1:

770 g of BA 80 g of MAA

Feed 2:

130 g of BA 20 g of MEMO

Feed 3:

30 g of tert-butyl peroctoate 130 g of toluene

An initially taken mixture consisting of a solution of 10% by weight of monomer feed I and 10% by weight of an initiator feed 3 and 550 g of toluene was brought to an internal reactor temperature of 95° C. under an inert gas atmosphere and prepolymerized for 10 min. Thereafter, three feeds were started, monomer feed 1, consisting of the acrylate monomers and unsaturated anhydrides being added in the course of 3 hours, monomer feed II, consisting of acrylate monomers and the silane compounds, in the course of 1 hour and initiator feed III, consisting of 30 g of tert-butyl peroctoate and 130 g of toluene, in the course of 4 hours. After the end of the feeds, polymerization was completed in the course of 3 hours at 95° C. and the solvent and residual volatile components were distilled off under reduced pressure.

In the case of mixtures with the accelerator DBTL or further copolymers, removal of the solvent by distillation was carried out after the mixing.

The further copolymers were prepared as described above (for composition, cf. Table 1).

TABLE 1

Composition of the copolymers

| Copolymer | Monomer % by weight | Si monomer % by weight | Si regulator % by weight | K value |
|---|---|---|---|---|
| V1* | 98 BA | 2 MEMO | — | 31 |
| E1** | 90 Ba, 8 MAA | 2 MEMO | — | 30.5 |
| E2 | 88 BA, 8 MAA | 2 MEMO | 2 MTMO | 21.9 |
| E3 | 88 BA, 8 MMA | 2 MEMO | 2 MTMO | 21.9 |
| E4 | 88 BA, 8 MAA | 2 MEMO | 2 MTMO | 21.9 |
| E5 | 88 BA, 8 MAA | 2 MEMO | 2 MTMO | 21.9 |
| E6 | 92 BA, 4 MAA | 2 MEMO | 2 MTMO | 28.7 |
| A1*** | 92 BA, 8 MAA | — | — | 37.0 |

*For comparison
**According to the invention
***For mixtures (see below)

Testing of perfrmance characteristics

The copolymers V1 and E1–E6 and copolymer blends in a weight ratio of 1:1 and 2:1 were tested for their suitability as sealing materials.

To determine the elongation at break and tensile strength, 1 mm thick films were produced from the self-curable copolymers and blends by application to silicone paper which had been stored for 6 months under standard conditions of temperature and humidity (23° C., 50% atmospheric humidity). Test specimens were then punched from the films, after which the elongation at break and tensile strength were measured according to DIN 53,504 at an advance rate of 100 mm/min.

TABLE 2

| Copolymer or blend | Addition of DBTL % by weight* | Tensile strength N/mm² | Elongation at break % |
|---|---|---|---|
| V1 | — | 0.092 | 147 |
| E1 | — | 0.198 | 177 |
| E2 | — | 0.153 | 187 |
| E3 | 0.2 | 0.186 | 171 |
| E4 | 0.6 | 0.192 | 164 |
| E5 | 0.8 | 0.199 | 162 |
| E6 | — | 0.142 | 191 |
| E2/A1 (1:1) | 0.2 | 0.356 | 323 |
| E2/A1 (2:1) | 0.2 | 0.486 | 363 |

*Based on copolymer or blend

We claim:

1. An essentially isocyanate-free, ketimine-free and aldimine-free, one-component sealing, adhesive or coating material which is self-curable under atmospheric humidity, comprising a copolymer A formed by copolymerizing a monomer mixture, comprising:
   (a) 50–99.8% by weight of a $C_{1-16}$-alkyl (meth)acrylate or a vinyl ester of a $C_{1-20}$ carboxylic acid;
   (b) 0.1–20% by weight of an unsaturated carboxylic anhydride;
   (c) 0.1–10% by weight of a Si-containing compound capable of undergoing hydrolysis; and
   (d) 0–40% by weight of a further, copolymerizable unsaturated compound, or comprising a mixture of copolymers comprising:

5–95% by weight, based on the mixture, of a copolymer B formed by copolymerizing a monomer mixture, comprising:
   (a) 50–99.9% by weight of a $C_{1-16}$-alkyl (meth)acrylate or a vinyl ester of a $C_{1-20}$ carboxylic acid;
   (b) 0–20% by weight of an unsaturated carboxylic anhydride;
   (c) 0.1–10% by weight of a Si-containing compound capable of undergoing hydrolysis; and
   (d) 0–40% by weight of a further, copolymerizable unsaturated compound, and 5–95% by weight, based on the mixture, of a copolymer C formed by copolymerizing a monomer mixture, comprising:
   (a) 50–99.9% by weight of a $C_{1-16}$-alkyl (meth)acrylate or a vinyl ester of a $C_{1-20}$ carboxylic acid;
   (b) 0.1–20% by weight of an unsaturated carboxylic anhydride;
   (c) 0–10% by weight of a Si-containing compound capable of undergoing hydrolysis; and
   (d) 0–40% by weight of a further, copolymerizable unsaturated compound, wherein the K value of one of the copolymers B or C is from 12 to 40 and that of the other copolymer is from 30 to 70, and wherein the K values of the two copolymers differ by at least 5K value units, where the K value is measured according to DIN 53,726.

2. A copolymer blend which is self-curable under atmospheric humidity comprising, based in each case on the blend, 5–95% by weight of copolymer B formed by copolymerizing a monomer mixture, comprising:
   (a) 50–99.9% by weight of a $C_{1-16}$-alkyl (meth)acrylate or a vinyl ester of a $C_{1-20}$ carboxylic acid;
   (b) 0–20% by weight of an unsaturated carboxylic anhydride;
   (c) 0.1–10% by weight of a Si-containing compound capable of undergoing hydrolysis; and
   (d) 0–40% by weight of a further, copolymerizable unsaturated compound and 5–95% by weight of copolymer C formed by copolymerizing a monomer mixture, comprising:
   (a) 50–99.9% by weight of a $C_{1-16}$-alkyl (meth)acrylate or a vinyl ester of a $C_{1-20}$ carboxylic acid;
   (b) 0.1–20% by weight of an unsaturated carboxylic anhydride;
   (c) 0–10% by weight of a Si-containing compound capable of undergoing hydrolysis; and
   (d) 0–40% by weight of a further, copolymerizable unsaturated compound, wherein the K value of one of the copolymers B or C is from 12 to 40 and that of the other copolymer is from 30 to 70, and wherein the K values of the two copolymers differ by at least 5K value units, where the K value is measured according to DIN 53,726.

3. The sealing, adhesive or coating material as claimed in claim 1, wherein c) is a compound of the formula

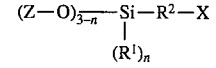

I

-continued
or $$(Z-O)_{\overline{3-n}}-\underset{(R^1)_n}{\overset{|}{Si}}-R^2-SH \qquad II$$

or mixtures thereof, where $R^1$ and Z are each $C_1$–$C_{18}$-alkyl or phenyl, $R^2$ is $C_1$–$C_{18}$-alkylene, cyclohexylene or phenylene, X is a group capable of undergoing free radical copolymerization and n is 0, 1 or 2.

4. A copolymer A) which is self-curable under the action of atmospheric humidity, as claimed in claim 1, containing a compound of the formula I:

$$(Z-O)_{\overline{3-n}}-\underset{(R^1)_n}{\overset{|}{Si}}-R^2-X \qquad (I)$$

as the Si-containing compound C), where $R^1$ and Z are each $C_{1-18}$-alkyl or phenyl, $R^2$ is $C_{1-18}$-alkylene cyclohexylene or phenylene, X is a group capable of undergoing free radical copolymerization and n is 0, 1 or 2.

5. A sealing, adhesive or coating material as claimed in claim 1, additionally containing a dialkyltin dicarboxylate for accelerating the self-curable by the action of atmospheric humidity.

6. A method of using the material containing a mixture of copolymers B) and C), as claimed in claim 2, as a sealing, adhesive or coating material which is self-curable under the action of atmospheric humidity.

7. A method of using the material containing a copolymer A, as claimed in claim 4, as a sealing, adhesive or coating material which is self-curable under the action of atmospheric humidity.

8. The sealing, adhesive or coating material according to claim 1, wherein the K value of said copolymer A is from 20 to 60, where the K value is measured according to DIN 53,726.

* * * * *